United States Patent [19]
Smith et al.

[11] Patent Number: 5,661,960
[45] Date of Patent: Sep. 2, 1997

[54] POWER TOOL ARM ENGAGING ASSEMBLY AND WHEELED PLATFORM FOR A LINE TRIMMER

[76] Inventors: Walker Smith, 11045 Treyburn Dr., Glen Allen, Va. 23060; James H. Bowen, 12190 Richland Dr., Catharpin, Va. 22018

[21] Appl. No.: 524,622

[22] Filed: Sep. 7, 1995

[51] Int. Cl.$^6$ ................................................ A01D 34/68
[52] U.S. Cl. ..................... 56/12.7; 56/12.1; 56/DIG. 9; 56/DIG. 18; 30/276; 7/167
[58] Field of Search ........................... 56/12.7, 12.1, 56/1, DIG. 9, DIG. 18; 30/276, 298, 121; 7/167; 16/113

[56] References Cited

U.S. PATENT DOCUMENTS

| | | | |
|---|---|---|---|
| 4,179,805 | 12/1979 | Yamada | 30/122 |
| 4,593,466 | 6/1986 | O'Brien | 30/272 |
| 4,688,376 | 8/1987 | Wolfe, Sr. | 56/16.7 |
| 4,845,929 | 7/1989 | Kawasaki et al. | 57/17.5 |
| 4,996,773 | 3/1991 | Albertson | 30/121 |
| 5,031,323 | 7/1991 | Honsa et al. | 30/298 X |
| 5,263,303 | 11/1993 | Stroud | 56/12.7 |
| 5,265,341 | 11/1993 | Kikuchi | 30/276 |
| 5,287,683 | 2/1994 | Smith | 56/12.7 |
| 5,361,851 | 11/1994 | Fox | 173/170 |

*Primary Examiner*—Terry Lee Melius
*Attorney, Agent, or Firm*—Whitham, Curtis, Whitham & McGinn

[57] ABSTRACT

A handle assembly, especially useful on power line trimmers, includes a fore arm rest or fore arm "contacting element" which retains the user's arm, a first handle positioned directly in line with a trough in said fore arm rest, and a second handle positioned to a side of the fore arm rest and first handle. In operation, the user's first hand and fore arm act in concert to direct the power tool, while the user's second hand acts to sweep the power tool from side to side, whereby the user's fore arm acts as a fulcrum at the fore arm rest of the handle assembly. By providing three points of contact with the user, the handle assembly allows the user to engage in a sweeping motion that is less strenuous and more easily controlled. In addition, the handle assembly provides better balancing of the power tool, and assists in maneuvering the power tool. Ideally, the first handle will pivot to any of a number of angles along an arc in alignment with the trough of the fore arm rest in order to accommodate the ergonomic requirements of a variety of different sized individuals. In the case of a power line trimmer, it is advantageous to have wheels on the protective housing which shrouds the cutting head which can be selectively rotated into a ground engaging position, or stored out of the way in a non-contacting position at the discretion of the user. A locking mechanism connected to the pivot plates on which the wheels are mounted is used to lock the wheels to roll along lines that are offset from perpendicular to the pole connecting the handle assembly to the cutting head by equal and opposite angles, thus permitting the line trimmer to be rolled in a sweeping fashion without the wheels changing directions at the end of each sweep.

19 Claims, 11 Drawing Sheets

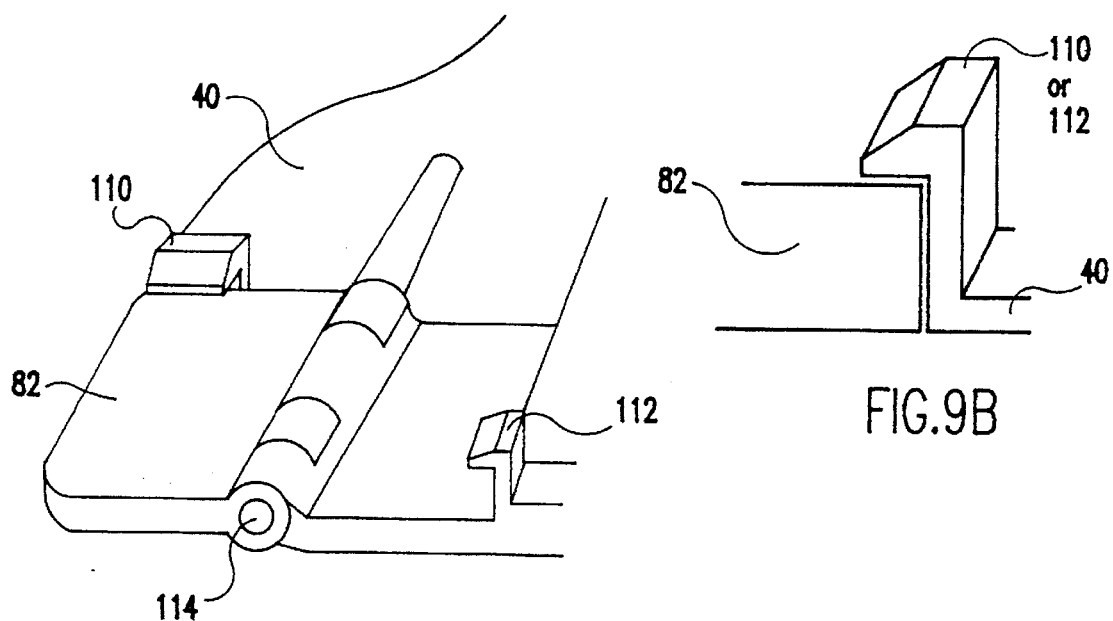
FIG.9B
FIG.9A
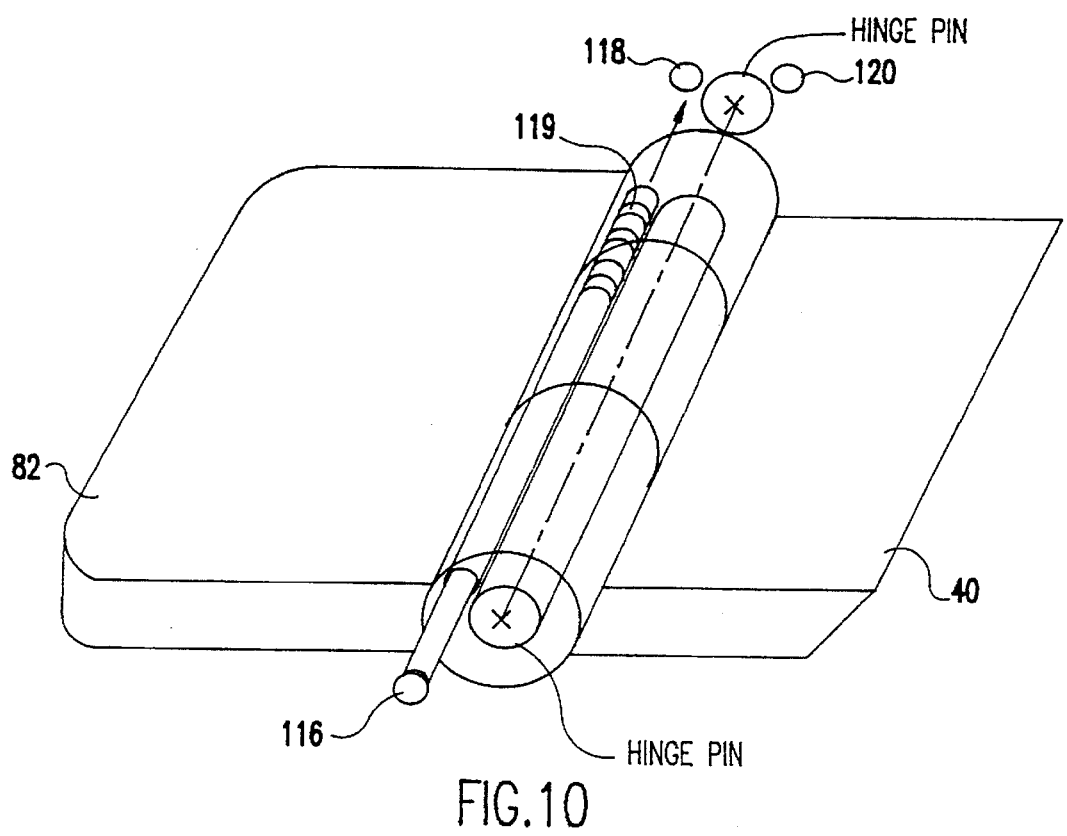
FIG.10

POWER TOOL ARM ENGAGING ASSEMBLY AND WHEELED PLATFORM FOR A LINE TRIMMER

DESCRIPTION

BACKGROUND OF THE INVENTION

1. Field of the Invention

The invention is generally related to power tools such as line trimmers, leaf blowers, and the like, and, more particularly, to the means by which the operator holds the power tool during operation. Specifically, the invention is related to an arm engaging system which allows the movements of the power tool to be controlled at the operator's elbow, rather than his or her wrist. Furthermore, the invention includes certain improvements in wheeled platforms which are used on power line trimmers. The improvements in the arm engaging assembly and the wheeled platform facilitate the user's ability to perform sweeping movements during operation of a power line trimmer.

2. Description of the Prior Art

Power line trimmers and leaf blowers have become commonplace household tools in the suburban United States. Almost any hardware store of reasonable size will carry several different makes and models of power line trimmers and leaf blowers. During operation of this type of equipment a user generally sweeps the tool back and forth to accomplish his objective of either trimming grass and weeds or blowing leaves into a pile. Despite this common practice by consumers, producers of line trimmers and leaf blowers have failed to provide these devices with gripping assemblies which reduce user fatigue and facilitate performing sweeping movements. Rather, the handles for most commercially available power tools do not satisfactorily consider consumer ergonomics. Thus, operation of the tools becomes quickly fatiguing, and this results in reduced user satisfaction and less effective operation of the tool.

Currently, no power line trimmers are commercially available which employ a wheel assembly that contacts the ground during operation. Conversely, there are several patented line trimmer wheel assemblies (see, for example, U.S. Pat. No. 4,922,694 to Emoto, U.S. Pat. No. 4,287,709 to Lowery et al., U.S. Pat. No. 4,411,126 to Lowery et at., U.S. Pat. No. 4,756,147 to Savell, and U.S. Pat. No. 4,688,376 to Wolfe et al.). The lack of commercial development of these patented designs appears to be related to their complexity and to their inability to provide the user with an effective means for sweeping across weeds and grass in manner which most closely simulates operation of the line trimmer without the wheels.

More recently, Smith has disclosed in U.S. Pat. No. 5,287,683, a platform for a power line trimmer which includes a "sweep-lock" feature whereby wheels on opposite sides of the platform are locked into an orientation where they roll along lines which are offset from perpendicular to the pole or "shaft" of the line trimmer by equal and opposite angles. The Smith design provides an effective means for rolling the platform across the ground surface in a sweeping motion. Unfortunately, the handle design proposed in Smith is not ergonomically suited to most users and requires the user to be centrally located behind the platform and use both arms to both direct and sweep the platform. U.S. Pat. No. 5,287,683 to Smith also discloses a "track lock" feature which allows the wheels to roll along a straight line for edging purposes.

SUMMARY OF THE INVENTION

It is an object of this invention to provide an ergonomically designed handle assembly for a power tool which allows movement of the power tool to be controlled by movements at the operator's shoulder and elbow, rather than at the operator's wrist, this being a more "natural" and less fatiguing pivot point.

It is another object of this invention to provide a handle assembly which includes a grip for the operator's hand and a forearm engaging member whereby, during operation, the grip and forearm engaging member move in unison with the operator's arm such that the tool performs as if it were an extension of the operator's arm.

It is yet another object of this invention to provide a handle assembly which includes a grip and forearm engaging member combination which is used predominately for directing the power tool, and a second grip positioned to one side of the combination which is predominately used for sweeping the power tool from side-to-side, balancing the power tool, and in assisting in maneuvering the power tool.

It is still another object of this invention to provide an improved rotary cutting tool used in lawn and garden trimming and/or pruning operations, such as a line trimmer, which has a handle assembly that permits improved side-to-side sweeping.

It is still another object of this invention to provide an improved rotary cutting tool used in lawn and garden trimming and/or pruning operations which has wheels positioned on a housing that covers a portion of the cutting tool, wherein the wheels are selectively deployed for contacting the ground for trimming operations to assist in maintaining a desired trim height.

It is still another object of this invention to provide a wheeled housing for a rotary line trimmer where the wheels are positioned behind the cutting head to provide for enhanced stability and two point reference cutting.

According to the invention, an ergonomically designed handle assembly for power tools includes both a hand grip and a forearm engaging member that is kept in contact with the operator's forearm during operation of the power tool. Because the arm is contacted firmly at two points, specifically the hand and the forearm, movements of the power tool are effectively controlled by the shoulder and elbow of the operator, as opposed to the wrist of the operator, and the power tool functions more like an extension of the user's arm. In this way, operation of the power tool is less fatiguing and results in improved utility for the consumer. In a preferred embodiment, the hand grip will be pivotable to different angular orientations with respect to the forearm engaging member to accommodate different gripping preferences by different users, and to accommodate users of varying heights and arm lengths.

To enhance the operator's ability to sweep the power tool from side to side, as he or she would when trimming weeds or grass or when blowing leaves, a second hand grip can be provided to one side of the hand grip/forearm engaging member assembly. This will allow the hand grip/forearm engaging member assembly to predominately perform the functions of pointing and directing the power tool, while the second hand grip will be used to apply the force required for sweeping the power tool from side-to-side. For power tools which will be partially user assembled, it would be advantageous to provide second hand grip configurations which can be affixed to either side of the hand grip/forearm engaging assembly, in order to accommodate the needs of both left handed and right handed users. Furthermore, it will be advantageous to provide a second hand grip configuration which can be rotated to different angular orientations with respect to the power tool to enable different operations to be performed more effectively (e.g., trimming along a wall versus trimming grass in an open area).

With power line trimmers and other pruning devices, such as those which employ rotary saw blades or the like, it is preferred to use a wheeled platform as the shroud for the rotating line or blades. The wheels will preferably be lockable so that they can roll along fixed lines set by the operator. For example, the wheels may be oriented and locked in a sweeplock mode which allows sweeping of the wheeled platform over a grassy area, or may be oriented and locked in a track-lock mode which allows the wheels to be rolled in a straight line along a wall or fence. In addition, the wheels will preferably be selectably deployable between an "in use" configuration where the wheels are in a ground contacting configuration and a "stored" configuration where the wheels are not positioned to contact the ground. To enhance sweep cutting through grass, the wheels are preferably of the enlarged radius variety (e.g., balloon wheels with rounded sides as opposed to straight sides). This allows for the wheels to move through the grass at angles that are not perpendicular to the rolling axis of the wheels. Enlarged radius wheels have been found to travel through grass more freely than other varieties of wheels.

BRIEF DESCRIPTION OF THE DRAWINGS

The foregoing and other objects, aspects and advantages will be better understood from the following detailed description of the preferred embodiments of the invention with reference to the drawings, in which:

FIGS. 8a–c, 9a–b, and 10 show alternative configurations for rotating the wheels of a wheeled platform for a line trimmer between an "in use" configuration, and a "storage" configuration;

DETAILED DESCRIPTION OF THE PREFERRED EMBODIMENTS OF THE INVENTION

A specific objective of this invention is to provide a power tool with an ergonomically designed gripping arrangement which allows the user to operate the power tool as if it were an extension of his or her own arm. To accomplish this objective, the gripping arrangement includes both a fore arm contacting element and a hand grip. When the operator's hand grips the hand grip, his or her fore arm is held in contact with the fore arm contacting element. This effectively immobilizes the operator's wrist. Control of the power tool is achieved through movements of the operator's shoulder and elbow, as opposed to his or her wrist. In essence, the power tool becomes an extension of the operator's arm, rather than functioning solely through hand contact which causes wrist and fore arm twisting.

Figure 1A:
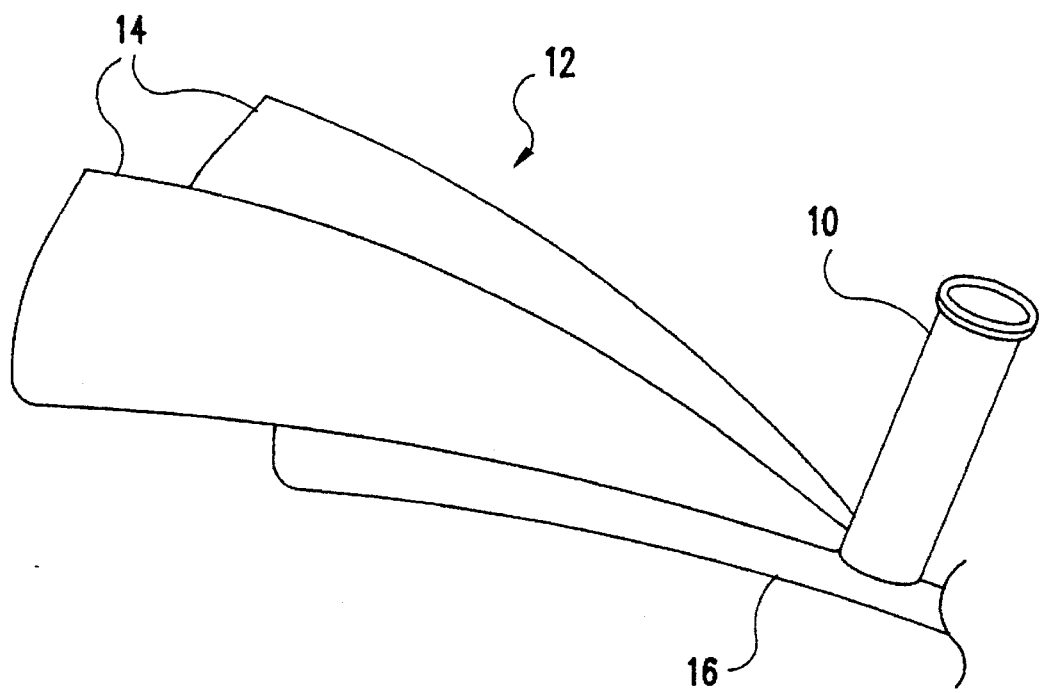
FIGS. 1a–c are isometric views of alternative designs of the hand grip and arm engaging assembly.
Figure 1B:
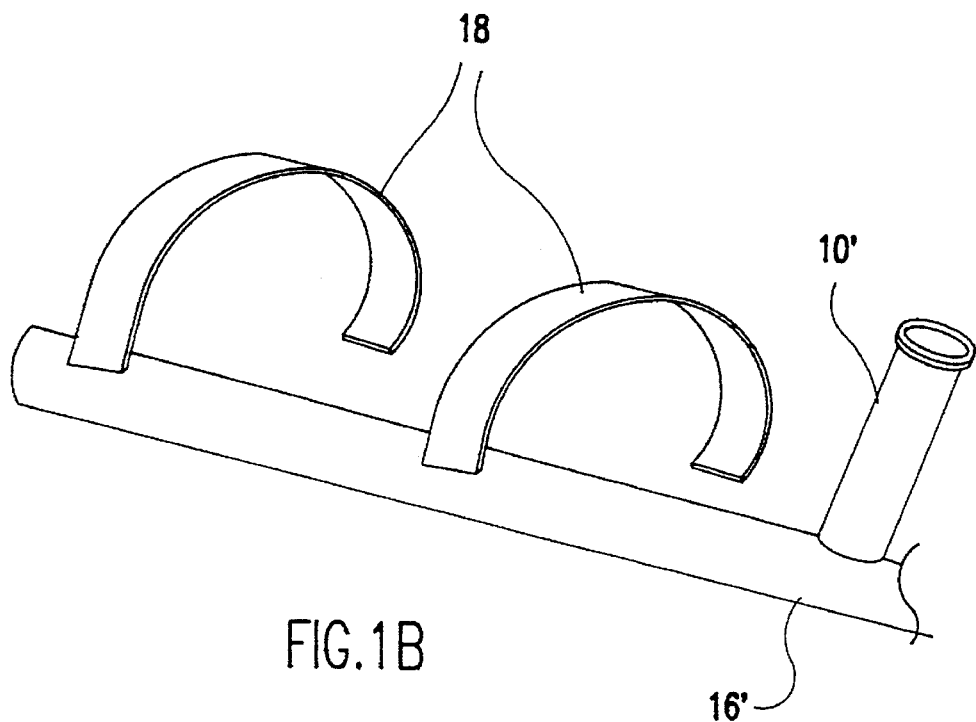

FIGS. 1a and 1b show alternative configurations for the arm engaging features of this invention.

In FIG. 1a, a hand grip 10 is positioned in front of a fore arm contacting element 12 which contacts the underside of a user's arm. When the user grasps the hand grip 10, his or her fore arm abuts against the fore arm contacting element 12. The hand grip 10 is oriented at an angle relative to the portion of the fore arm contacting element 12 which contacts the user's arm to accommodate the natural angle created between the user's fore arm and grip when the user's wrist is upright and the power tool attached to shaft 16 is directed downwards. As will be discussed below, the angular orientation of the hand grip 10 can be fixed or variably set by the user. In the FIG. 1a design, the fore arm contacting element 12 has curved side walls 14 which are positioned on either side of a trough in which the user's fore arm is positioned. The weight of the power tool (not shown) connected to the end of shaft 16 causes the fore arm contacting element 12 to abut firmly against the user's fore arm, and the side walls 14 maintain the user's fore arm in the trough of the fore arm contacting element. In operation, the power tool essentially acts as an extension of the user's arm, whereby movements at the operator's arm and elbow are used to point or direct the shaft 16 of the power tool as desired to effect a sweeping operation or the like. Since the user's arm is positioned in contact with the fore arm contacting element 12, and remains in contact by virtue of the side walls 14 during movement of the power tool, the user's wrist is essentially immobilized and is not used to effect sweeping operations or the like.

Movement of the point of control of the power tool from the user's wrist and hand to the user's shoulder and elbow is an important feature of this invention, and allows the power tool to be operated in a more reliable and less fatiguing fashion. While FIG. 1a shows the use of sidewalls 14 for maintaining the user's fore arm in contact with the fore arm contacting element, it should be understood that other elements, such as straps (not shown) which are fastened around the arm and connected to the shaft 16, can be used for the purpose of maintaining the fore arm contacting surface in contact with the user's fore arm. Furthermore, the design or shape of the side walls 14 can be varied from that shown in FIG. 1a where the height of the side walls 14 becomes progressively larger at increasing distances from the hand grip 10. For example, the side walls might advantageously be provided as simple U-shaped members affixed to the shaft.

The FIG. 1a design is particularly useful for power line trimmers, pruners, or the like, where the cutting head (not shown) on the end of shaft 16 provides weight which forces the fore arm contacting element 12 to firmly abut against the user's fore arm. However, with power tools such as leaf blowers or the like which are ordinarily swept back and forth during use the nozzle or other active element is light weight. Thus, absent the use of connecting straps or other features, the design with side walls 14 shown in FIG. 1a may not be very effective for maintaining the user's fore arm in contact with the fore arm contacting element 12.

FIG. 1b shows an alternative arm engaging design which is particularly useful for leaf blowers and similar power tools which do not have any elements of significant weight extended away from the arm (e.g., most of the weight is under the arm rather than at a point extended away from the arm). Specifically, the arm engaging design will include both a hand grip 10' and a shaft 16' connected to the power tool. In the case of a leaf blower, the shaft 16' may comprise part of the blower nozzle. In addition, one or more inverted fore arm contacting elements 18 will extend from the shaft over top of the user's fore arm. The inverted fore arm contacting elements 18 will operate in conjunction with the hand grip 10' in the same way as discussed above in conjunction with FIG. 1a. Specifically, the user will grip the hand grip 10' and the user's fore arm will abut against the inverted fore arm contacting elements 18 such that the direction and movement of shaft 16' will be controlled by the user's shoulder and elbow, rather than his or her wrist.

Figure 1C:
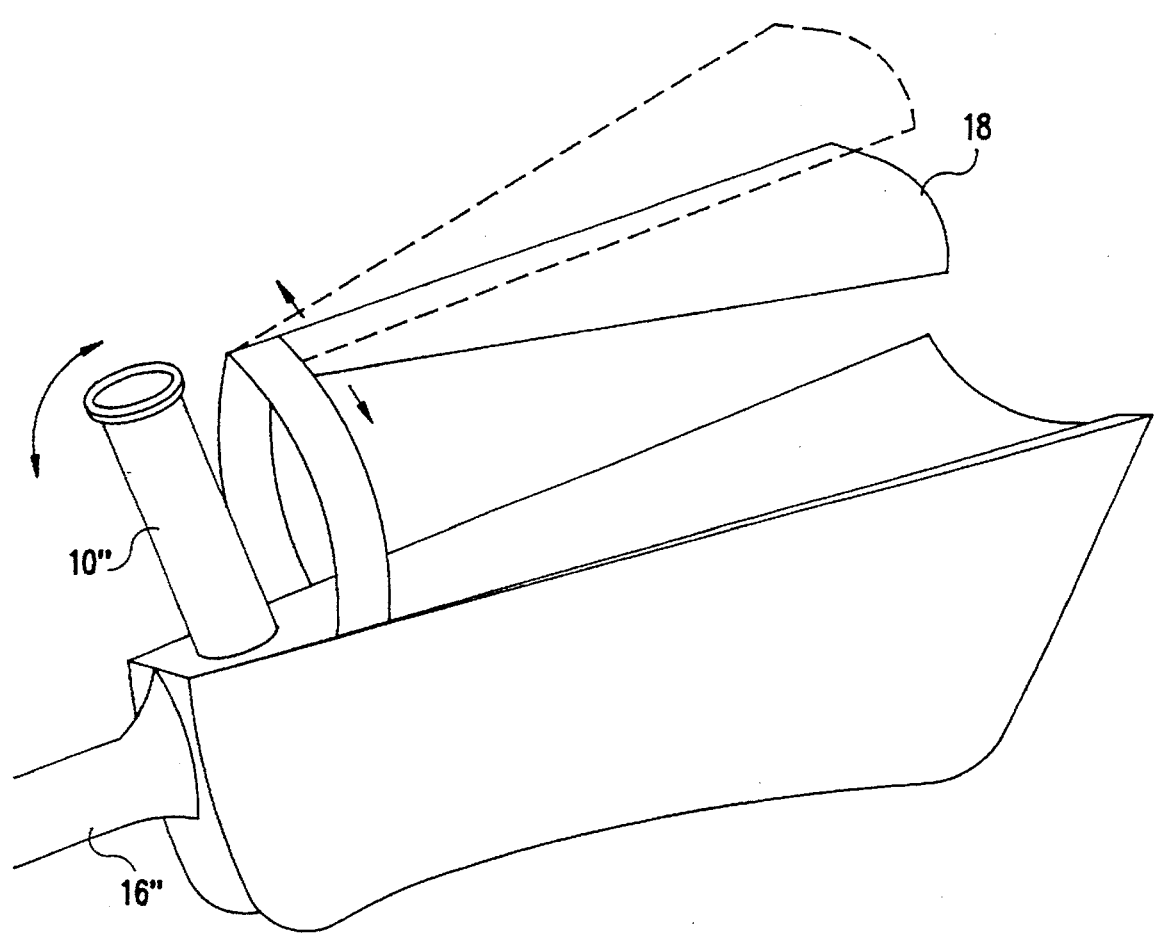

FIG. 1c is similar to FIG. 1b in that it utilizes an inverted fore arm contacting element 18', however, the element 18' is contoured to match the shape of the fore arm. In addition, the inverted contacting element 18' may be moveable between an arm engaging position and a non-engaging position.

Figure 2:
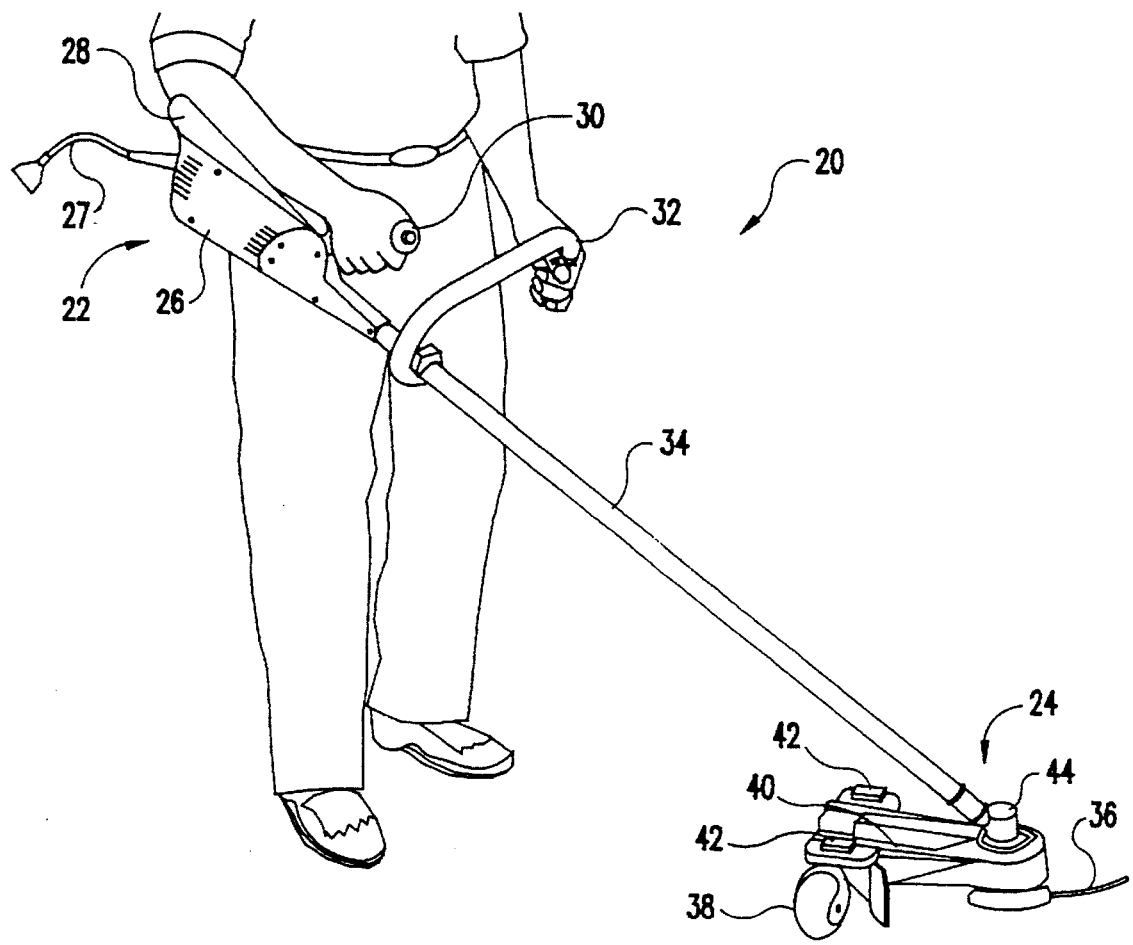
FIG. 2 is an isometric view of a person holding a power line trimmer which includes the arm engaging assembly and wheeled platform of the present invention.

FIG. 2 shows a power line trimmer 20 being operated by a person. The power line trimmer includes both the arm engaging mechanism 22 and the wheeled platform 24 of the present invention. It should be understood that the arm engaging mechanism 22 can be used on other power tools such as leaf blowers or the like. The power line trimmer 20 includes an electric motor 26 positioned under the fore arm contacting element 28, a first hand grip or "first handle" 30 positioned in front of the fore arm contacting element 28, and a second hand grip 32 connected to the shaft 34. In operation, a user's hand grips the hand grip 30 and his or her fore arm rests in and is retained in the fore arm contacting element 28. The arm which grips the hand grip 30 is used for directing and pointing the cutting element 36 to desired locations. Because the user's arm is in continuous contact with the power line trimmer 20 from the hand grip 30 through the fore arm contacting element 28, the cutting element 36 moves in unison with the user's arm and essentially operates as an extension of the user's arm. Movements of the cutting element 36 are controlled by movements of the user's shoulder and elbow, as opposed to his or her wrist. The second hand grip 32 is predominately used for sweeping the cutting element 36 back and forth when the wheels 38 are oriented to engage the ground. In addition, the second hand grip 32 will assist in balance, movement, and guidance. The wheels 38 on platform 40 are used for guiding the cutting element 36 over weeds and grass and for maintaining the cutting element 36 at a fixed height above the weeds and grass.

Positioning wheels 38 behind the cutting element 32 is preferred because in this position the wheels provide a relatively flat reference plane for more uniform trimming compared to a design where the wheels are positioned to the sides of the platform. This is because in the rear position, the wheels 38 travel on previously cut grass which is at the same height at which the user is attempting to cut grass forward of the cutting element. By contrast, when the wheels are positioned to the sides, at least one of the wheels will travel on uncut grass and the other wheel will travel on cut grass, thus, the reference angle for cutting will be uneven due to the non-uniform height of the cut and uncut grass. The use of two wheels 38 provides both stability and two points of reference, both of which are located on pre-cut grass, for guiding the cutting head.

The motor 26 shown in FIG. 2 is electric as can be seen by extension cord 27; however, it should be understood that gasoline driven motors or other power plants could be used in the practice of this invention. The power of the motor 26 can vary considerably depending on the application (e.g., cutting grass versus pruning trees and bushes, industrial use versus consumer use, line trimmer versus leaf blower, etc.) and should be selected to meet the application requirements. The line trimmer 20 design shown in FIG. 2 locates the motor 26 directly under the fore arm contacting element 28. This gives the line trimmer 20 a compact character that is useful for manufacturing and shipping, in addition to being easier for a consumer to use since the weight of the motor 26 presents less of a balancing problem during operation. However, it should be understood that the motor 26 may advantageously be positioned at any point on the shaft 34 including at points that will be located behind or in front of the user's arm during operation of the line trimmer. In addition, the motor might also be located on the platform 40.

While the cutting element 36 is shown to be a filament, it should be understood that rotary cutting blades and other cutting elements may be used in the practice of this invention. For example, if mulching is desired, a fan blade element might be employed wherein the fan blades continuously direct the cut grass and weeds upward towards the platform 40 such that they may be cut multiple times before being deposited on the ground, and if pruning is desired, a metal rotary saw blade or metal sickle elements might be attached for cutting the limbs of trees and bushes. In addition, several variations of filament style cutting elements may be employed in the line trimmer 20 of this invention. For example, the cutting element 36 could be of the unwinding spool variety that is automatically advanced by the user, or of the variety where a web of several filaments or a plurality of co-planar projecting filaments are attached as a rotatable disk. In addition, a combination filament design might be used as the cutting element 36 wherein short filaments project from blade like members that are affixed to a rotatable disk. The invention has particular utility with oscillating blades for pruning, and for filament and flexible blades for cutting grass and weeds.

The wheels 38 on the platform 40 are preferably of the enlarged radius variety wherein the base and sides of the wheels 38 are rounded instead of having flat sides. Good results have been obtained with wheels which are four inches in diameter and have a radius approaching two inches (e.g., they are almost spherical). Having wheels 38 with rounded sidewalls and base allows the user to more easily move the platform 40 forward and backward through the grass while the platform is being swept from side to side because the roundness will allow some travel on the sides of the wheels. While FIG. 2 shows the use of castor wheels as wheels 38, it should be understood that other types of wheels might advantageously be used in the practice of this invention. For example, non-castor wheels can be secured or molded to platform 40 in the ground engaging position permanently oriented for sweep cutting. Furthermore, the wheel diameter can be varied to suit the needs of the user or application. As will be discussed below, the wheels 38 are selectively deployable between an "in-use" configuration as shown in FIG. 2, and a "storage" position where the wheels do not contact the ground. This enables the line trimmer to be used in grass where wheels may be a hindrance, and to perform operations where wheels are not required such as edging or the like, and to perform trimming and other standard trimmer operations.

As will be discussed in greater detail below, wheel locking elements 42 are provided on the platform 40 for locking the wheels 38 to roll along preset pathways similar to that described in U.S. Pat. No. 5,287,683 to Smith. If the line trimmer 20 is to be used for cutting grass in weeds in a side-to-side sweeping fashion, the wheels 38 will preferably be locked to roll along lines that are angularly offset from perpendicular to the shaft 34 by equal and opposite degrees. The preferred angular offset for the wheels will range from 5° to 20°. This mode of operation is referred to as the "sweep-lock" mode. In the "sweep-lock" mode, the fore arm contacting element 28 acts in conjunction with the wheels 38 to assure that the cutting element 36 evenly contacts the grass at a horizontal or slightly downward cutting angle for the grassy area which is being trimmed. If the line trimmer 20 is to be used for cutting against a wall or fence, the wheels may be locked to roll along lines that parallel the wall or fence. This mode of operation is referred to as the "track-lock" mode. In the "track-lock" mode, the combination of the hand grip 30 and fore arm contacting element 28 act in conjunction with the wheels 38 to assure that the cutting element is directed down a line adjacent the wall or fence where trimming is to be performed.

While the shaft 34 shown in FIG. 2 is straight, it should be understood that a curved shaft may also be employed in the practice of this invention. In the case of a straight shaft 34, as is shown in FIG. 2, it may be advantageous to provide a connector 44 at the end of the shaft which can adjust the angle of the shaft 34 relative to the cutting element 36. An adjustable connector 44 could be used for optimizing the angle of the shaft 34 to the needs of the operator. Good results have been achieved when the angle is between 25° and 45°, therefore, if the connector 44 is not adjustable, it is recommended that it be designed to provide an angular orientation between 25° and 45° (e.g., approximately 35° is preferred), and if the connector is adjustable, it is recommended that it be designed to accommodate the angular range of 25°–45°.

Preferably, the second hand grip 32 can be positioned on either side of the shaft 34 to comfortably accommodate both right handed and left handed operators. In addition, it is advantageous to provide a mechanism for moving the position of the hand grip 32 to different angular orientations with respect to the shaft 34 in order to accommodate different operations. For example, having the second hand grip 32 extending in a perpendicular direction from the shaft 34 where both the user's hands are close to a side-by-side position, as is shown in FIG. 2, allows the user's second hand to more easily perform the function of sweeping the shaft 34 back and forth, thereby causing the cutting element 36 to sweep from side-to-side. In this way, the user's first hand on hand grip 30 and arm in contact with fore arm contacting element 28 are predominately used to move the cutting element 36 forward, while the second hand and arm are predominately used to generate the sweeping motion with handle 32. However, if weeds against a wall are to be trimmed, such as when the line trimmer is operated in "track lock" mode, or if the line trimmer 20 is to be used more like an edger with the cutting element 36 directed downward against a curb or patio surface, it would be advantageous to move the location of the hand grip 32 such that the user's second hand is positioned more forward or more rearward of the user's first hand.

Figure 3A:
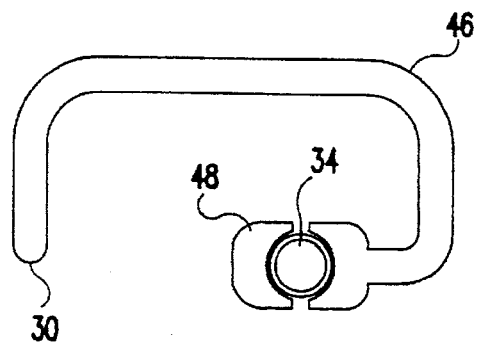
FIGS. 3a–e are plan views of alternative designs for a second handle which can be connected to the shaft of a line trimmer.
Figure 3B:
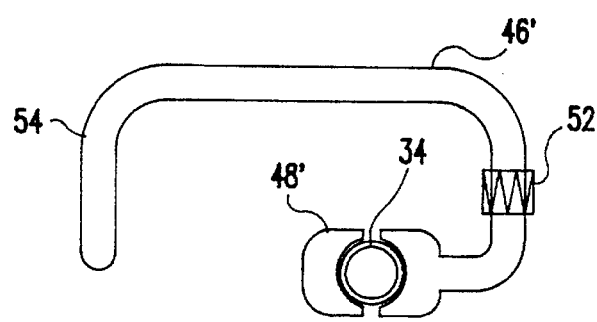
Figure 3C:
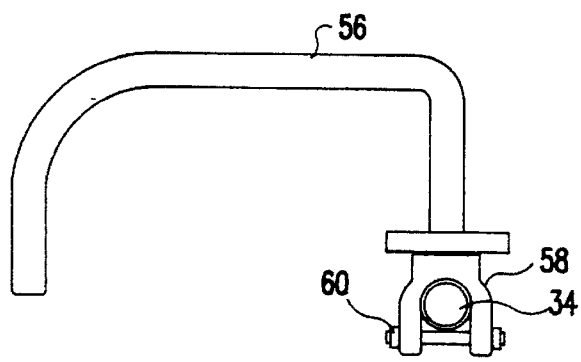
Figure 3D:
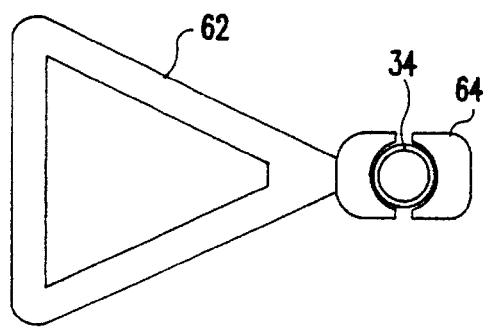
Figure 3E:
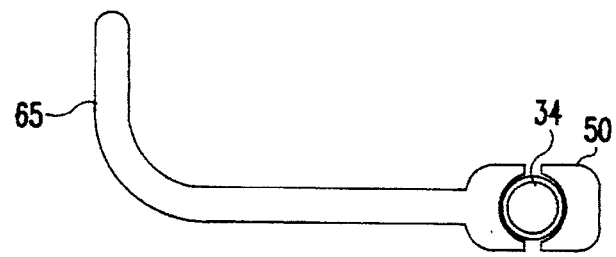

FIGS. 3a–e show several different "second handle" designs which can be used within the practice of this invention. It should be understood that several different designs for the second hand grip may also be used within the practice of this invention. It should be understood that any handle, so long as it is positioned to the side of the fore arm contacting element 28/first handle 30 combination, might be advantageously used in the practice of this invention. In addition, while each of the handles shown in FIGS. 3a–e are connected to the shaft 34, it should be understood that in some instances the second handle might advantageously be connected to a second location on the power tool. For example, in a large industrial pruner, it may advantageous to have the first and second handles connected directly to the cutting assembly (not shown). FIG. 3a shows an elongated handle 46 which extends to the left and the fight of the pole 34. The handle 46 is clamped to the handle by a clamp 48. FIG. 3b shows a handle 46' which is similar to that shown in FIG. 3a, except that a pivot-lock mechanism 52 is included to allow the furthest portion 54 of the handle 46' to move forward and rearward relative to the shaft 34. Pivoting of the handle 46' allows the user's second hand to be positioned forward or rearward of the user's first hand, as would be preferred when operating the line trimmer in "track lock" mode, or when performing an edging operation. FIG. 3c shows an inverted U-shaped handle 56 which clamped to the shaft 34 by a clamp 58. By removing screw 60 from clamp 58, the handle 56 can be positioned to the either the left or right side of the shaft 34. FIG. 3d shows a triangular handle 62 clamped to the shaft 34 by clamp 64. To position the handle 62 on the opposite side of the shaft 34 or on top of the shaft 34, the user need only loosen the clamp 64, rotate the handle, and then re-tighten the clamp 64. FIG. 3e shows upwardly projecting hand grip 65 connected to shaft 34 by clamp 50.

Figure 4:
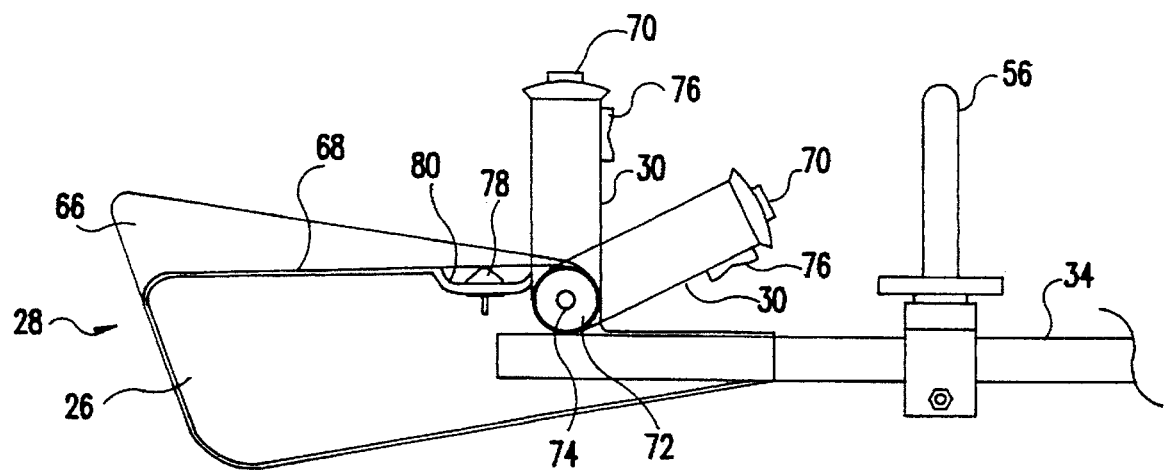
FIG. 4 is a side view of the motor, first and second handles, and fore arm contacting element of an arm engaging device that can be used on a power line trimmer or other power tool.
Figure 5:
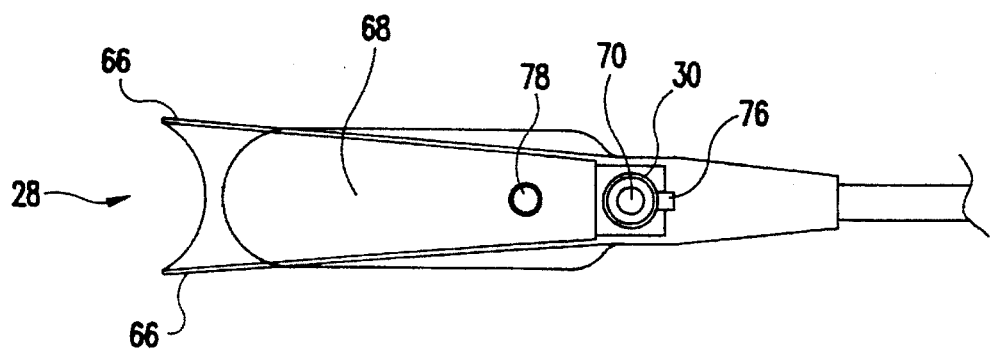
FIG. 5 is a top view of the fore arm contacting element and first handle shown in FIG. 4.

FIGS. 4 and 5 show detailed views of the fore arm contacting element 28 and first handle 30 combination shown in FIG. 2. The side walls 66 of the fore arm contacting element 28 are preferably curved and connected at the bottom by a curved trough 68 which is integral with or positioned on top of the motor 26 housing. The side walls 66 are flared outwardly towards the rear and rise to a higher level above the trough 68 towards the rear. The curved design, outward flaring, and increasing height toward the rear of the side walls 66 allow the fore arm contacting element 28 to better accommodate the contours of the human fore arm. Although not shown or required, straps could be provided to aid in holding the user's fore arm inside the trough 68 during operation of the line trimmer. It is advantageous to have a long fore arm contacting element 28 (e.g., 5–10 inches) which will assist in having the user's hand and fore arm move in unison. Contiguous fore arm contact with the trough of the fore arm contacting element 28 is the result of the adjustable angle of the handle 30 allowing the user's wrist to remain straight and, therefore, maintain contact with the fore arm trough which extends continuously from the handle. Preferably, there is no gap between the handle 30 and the trough in the fore arm contacting element 28. This will allow the user's arm to freely rotate at his or her elbow to accomplish a side-to-side sweeping motion. Having relatively higher side walls 66 at the rear end of the fore arm contacting element 28 will assure that the side-to-side motion imparted to the shaft is generated by the user's shoulder and elbow, as opposed to his or her wrist.

As discussed above, an important feature of this invention is to have provide an arm engaging mechanism that allows the user's shoulder and elbow to control the power tool as an extension of his or her own arm, and to eliminate the need for wrist/hand control. While FIGS. 4 and 5 show a fore arm contacting element comprised of side walls and a trough 68, it should be understood that other elements could also be used in the practice of the invention. For example, a depression inside a housing member might be used to accommodate a user's fore arm, an inverted fore arm engaging member, or a series of hangers or wrap around devices may be provided for engaging the user's fore arm.

An advantage of the design shown in FIGS. 4 and 5 is that the handle 30 can be positioned directly in front of the fore arm contacting element 28, and the two elements can be directly secured to the shaft 34 of the power tool such that the cutting element 36 is in direct alignment with the user's arm and essentially functions as extension of his or her arm. For some power tools, it may be advantageous to have the shaft or other element of the power tool slightly out of alignment with respect to the fore arm contacting element 28/handle 30 combination; however, even if an out of alignment arrangement is used, the power tool will still move in unison with movements of the user's hand and fore arm.

FIG. 4 shows that in a preferred embodiment of the invention, the handle 30 is pivotal along an arc that is in alignment with the trough 68 of the fore arm contacting element. A pivot actuator 70 positioned on top of the handle 30 allows the handle to selectively move between a number of different angular orientations with respect to the shaft 34. In operation, the pivot actuator 70 will selectively engage or disengage a locking member 72, such that when disengaged, the handle 30 can pivot freely about pivot member 74, and when engaged, the handle 30 will remain locked at a desired angle with respect to the shaft 34. For exemplary purposes only, FIG. 4 shows the handle 30 at angular orientations of 30° and 90° with respect to shaft 34. To provide maximal utility, it is preferred that the handle 30 be positionable at angles between 0° (or parallel) and 90° or more, to accommodate the ergonomic requirements of different users. If the power tool, such as a line trimmer, is to be provided with a "fixed" handle that does not rotate with respect to the shaft 34, the handle 30 will preferably be oriented between 20° and 90°, and most preferably between 35° and 55°. Alignment of the handle 30 with the trough 68 is preferred, but not required. Having the handle in alignment with the trough 68 assists in assuring that the wrist is not relied upon for causing movement of the power tool and to better accommodate right and left handed users.

FIG. 4 shows that the trough 68 of the fore arm contacting element 28 is preferably at a slightly lower angle than the shaft 34. Although not shown, it may be advantageous to provide a fore arm contacting element 28 which is angularly adjustable with respect to the shaft 34. The angular adjustment of the trough 68 with respect to the shaft 34 can be used to accommodate the different ergonomic requirements of different users, and to assist in controlling the angular orientation of the cutting element 36 with respect to the user's arm and user's height. Preferably, the trough 68 will be either fixed or adjustable to any angle between −30° and 30° with respect to the shaft 34.

Control of the operation of the power tool (e.g., the speed at which the cutting element of a line trimmer is turned, or the velocity of air which is expelled from a leaf blower, etc.) is accomplished using a trigger actuator 76 located on the handle 30. In operation, the user depresses the trigger actuator 76 when the power tool is to be operated and releases the trigger actuator 76 to stop the power tool. It should be appreciated that trigger actuator 76 could be variable to give infinite speed adjustment to the cutting head.

In a particular embodiment, the motor 26 used in the power tool is a two speed motor, and the switch 78 for adjusting motor speeds can be located in a depression 80 in the trough 68 of the fore arm contacting element. The switch 78 can be of the sliding, lever or push button varieties. Locating the switch 78 inside the trough 68 serves to protect it from dirt and other debris during operation since the user's arm will cover the switch 78 while the power tool is operating. Other types of switches may also be advantageously located within the fore arm contacting element 28.

Figure 6:
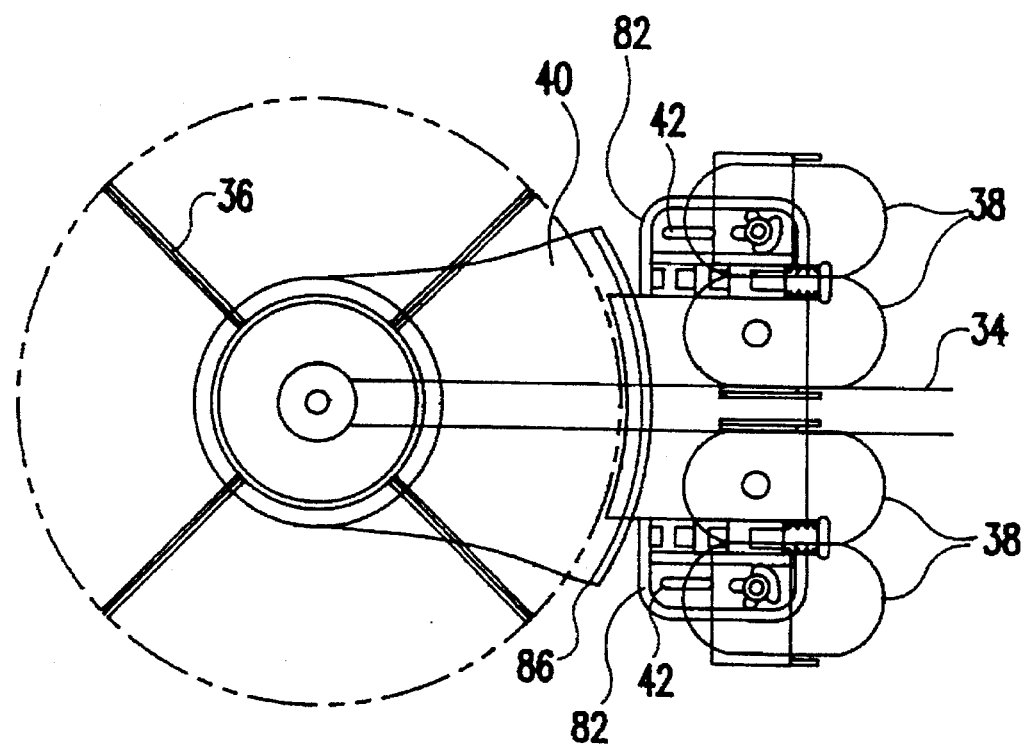
FIG. 6 is a top view of a wheeled platform for use on a power line trimmer.
Figure 7:
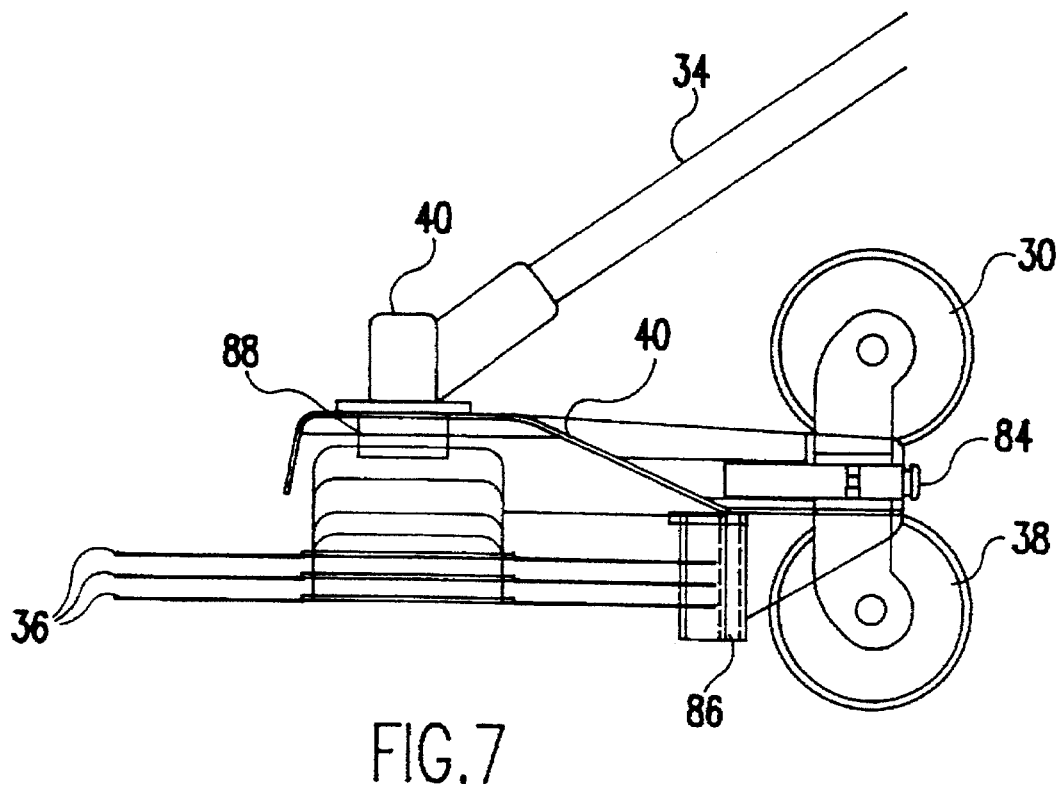
FIG. 7 is a side view of the wheeled platform shown in FIG. 6.

FIGS. 6 and 7 show the top and side view of the wheeled platform 40 used on the line trimmer shown in FIG. 2. For exemplary purposes, the wheels 38, positioned on the platform 40 on either side of the shaft 34 are shown in both their deployed "in use" configuration where they project downward from the platform to engage the ground surface, and in their "storage" position where they are flipped upward to a non-ground engaging position adjacent the shaft 34. Being able to selectively deploy the wheels 38 allows the user the versatility of using the line trimmer in a conventional manner without wheel to ground engagement, and in a manner which allows better trimming height control wherein the two wheels are deployed to roll along fixed lines preset by the locking mechanism 42 (which will be discussed in further detail below) using the user's fore arm as a brace for maintaining height uniformity. The wheels 38 are connected to rotatable plates 82 that pivot about hinge pin 84. A downwardly projecting plate 86 protects the wheels 38 from the cutting element 36 and any cut debris created by the cutting element 36. As discussed above, the cutting element 36 can be varied within the practice of this invention and can include webs of four or more filaments as shown in FIG. 6, unwinding filament spools, rotary blades, and rotary cutting elements, as desired by the manufacturer. In addition, the manufacturer may offer different cutting elements as interchangeable parts to be used with the power line trimmer.

Preferably, the width between the wheels 38 when the wheels are deployed is 7–10 inches, and is less than the diameter of the cutting element 38. A smaller width between the wheels permits easier shipping and storage, as well as easier maneuvering by the consumer.

FIG. 7 shows the cutting element 36 at three different heights with respect to the underlying grass or weeds. Height adjustment may be controlled simply by adding or subtracting spacers 88 between the platform 40 and the cutting element 36. Other arrangements for raising and lower the cutting element may also be employed within the practice of this invention. Alternatively, the cutting element 36 could simply be "fixed" with respect to the platform 40 and/or wheels 38.

FIGS. 8a–c, 9a–b, and 10 show different examples of locking mechanisms which can be used in conjunction with the deployable wheels 38 shown in FIGS. 6 and 7.

Figure 8A:
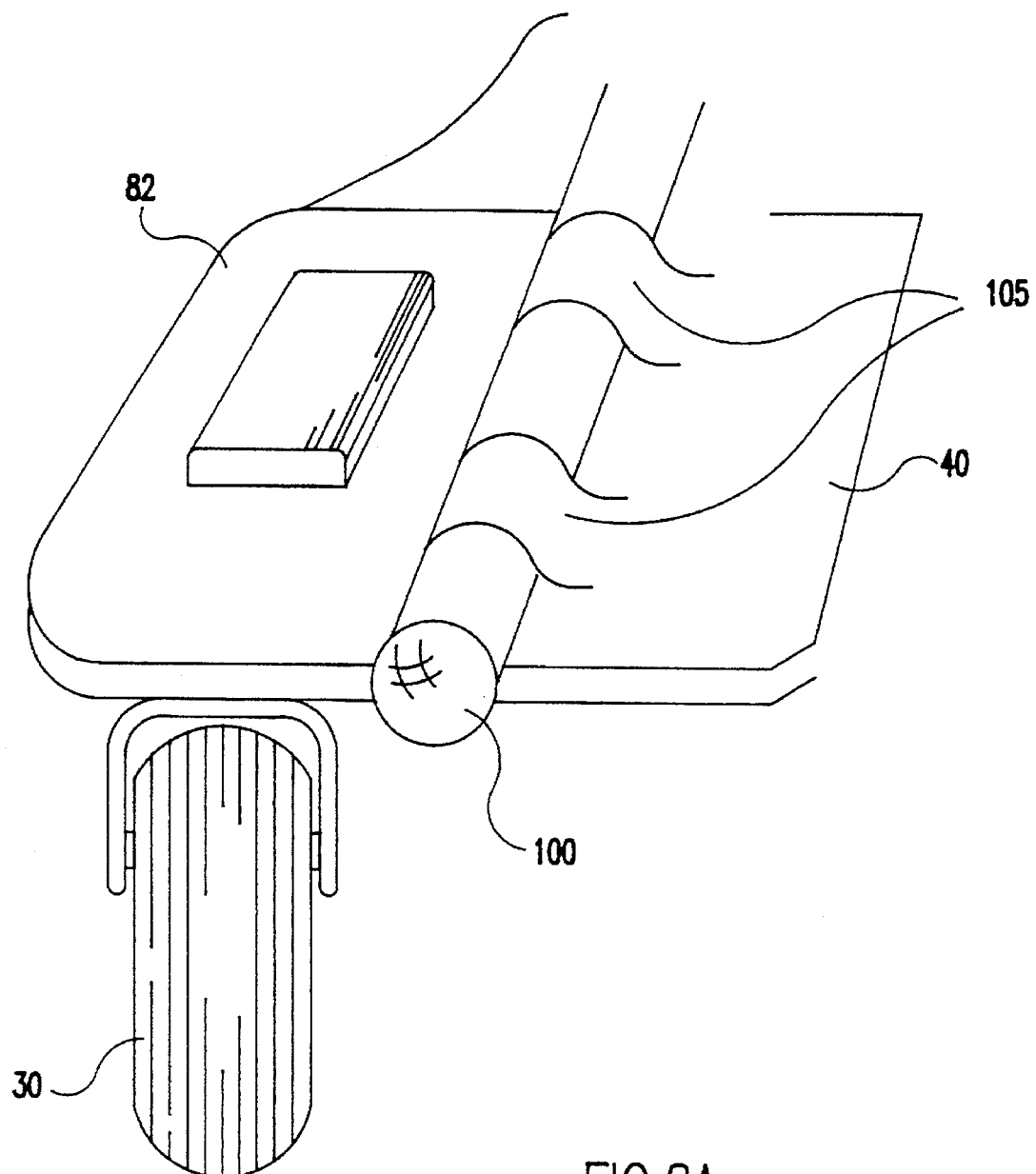
Figure 8B:
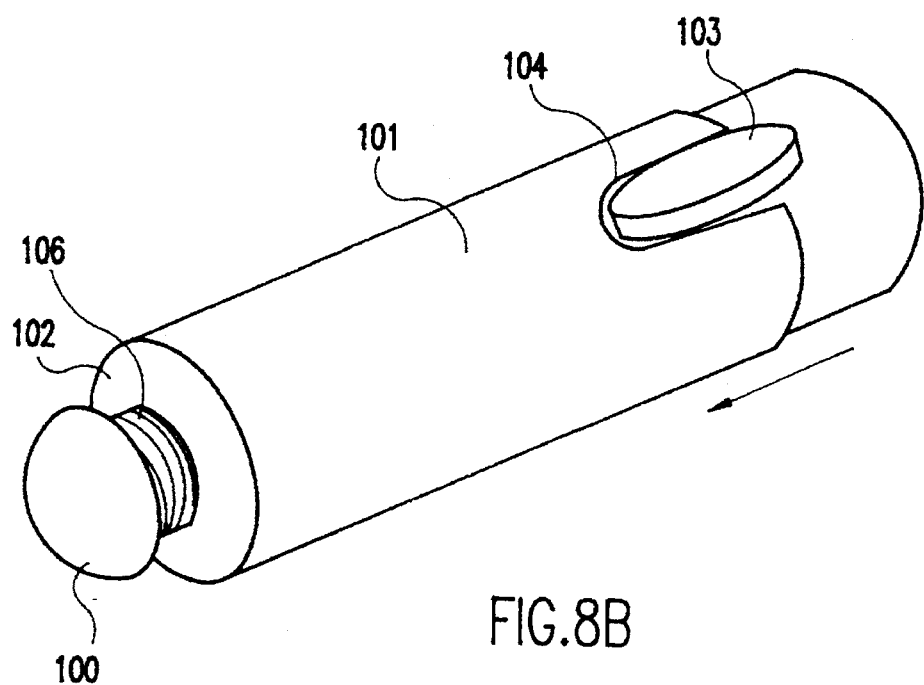
Figure 8C:
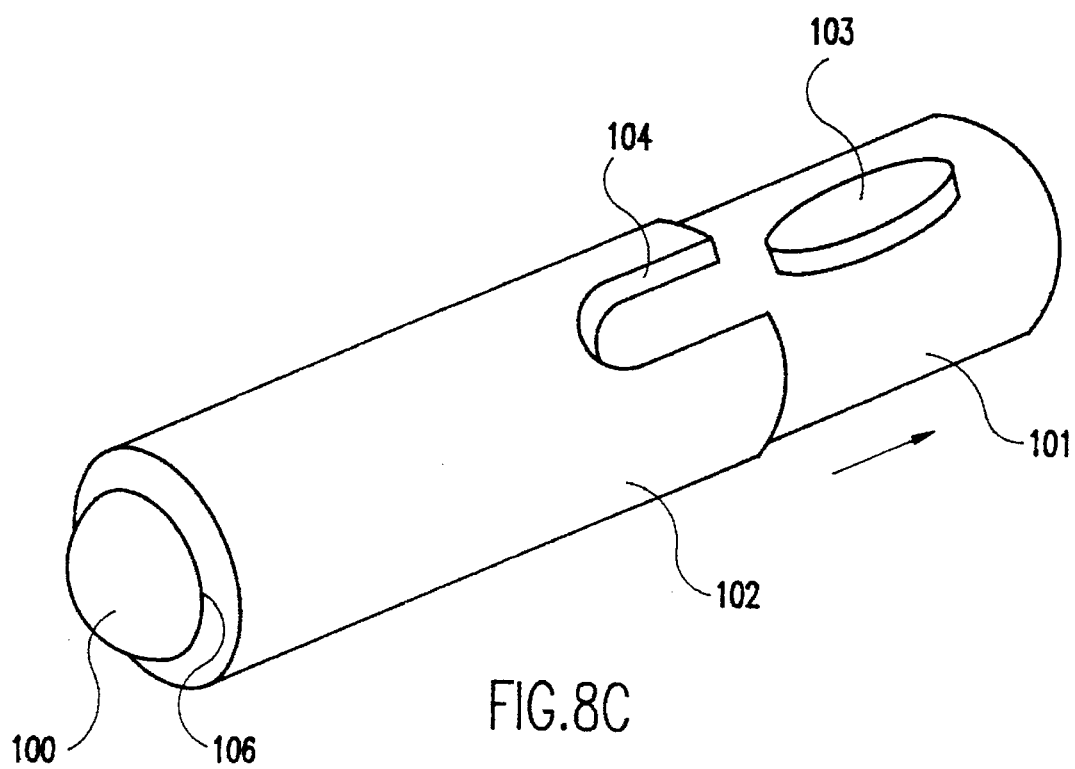

FIGS. 8a–c show a push button, spring-loaded hinge mechanism. In FIG. 8a, the rotatable plate 82 with wheel 38 is connected to the platform 40 by hinge mechanism 105. FIGS. 8b–c show the locked and unlocked configurations, respectively. In the unlocked configuration, pawl 103 on slide pin 101 is disengaged from the locking slot 104 in the housing member 102 of the hinge mechanism 105. By compressing the spring 106 using push button 100, the pawl 103 is released from the locking slot 104 to unlock the rotatable plate 82. Decorepressing the spring 106 causes the slide pin 101 to move to a position where pawl 103 is retained in locking slot 104. In the unlocked configuration, the rotatable plate 82 is free to rotate between the "in use" configuration and the "storage configuration".

FIGS. 9a and 9b show down 110 and up 112 locking pawls affixed to the platform 40. The rotatable hinge plate 82 is captured underneath the top of the pawl 110 or 112 to hold it in either the "in use" or "storage" configuration respectively. When an operator desires to move the wheels from the "in use" configuration shown in FIG. 9a, he or she depresses the top of pawl 110 enough for the plate 82 to slide by, rotates the plate 82 around pivot pin 114, and pushes the plate 82 down underneath pawl 112.

FIG. 10 shows a pull out spring loaded pin configuration wherein the rotatable hinge plate 82 is locked in the wheels deployed, "in use" ground engaging position using pin 116 by inserting the pin into locking hole 118. The pin 116 is spring 119 loaded to allow its withdrawal from locking hole 118 simply by depressing the pin. To move the rotatable hinge plate 82 to the wheels "storage" position on top of platform 40, the pin 116 is unlocked and the plate 82 is rotated about hinge pin 122. The pin 116 is then inserted into locking hole 120 to lock the plate 82 and wheels in the "storage" configuration.

Figure 11:
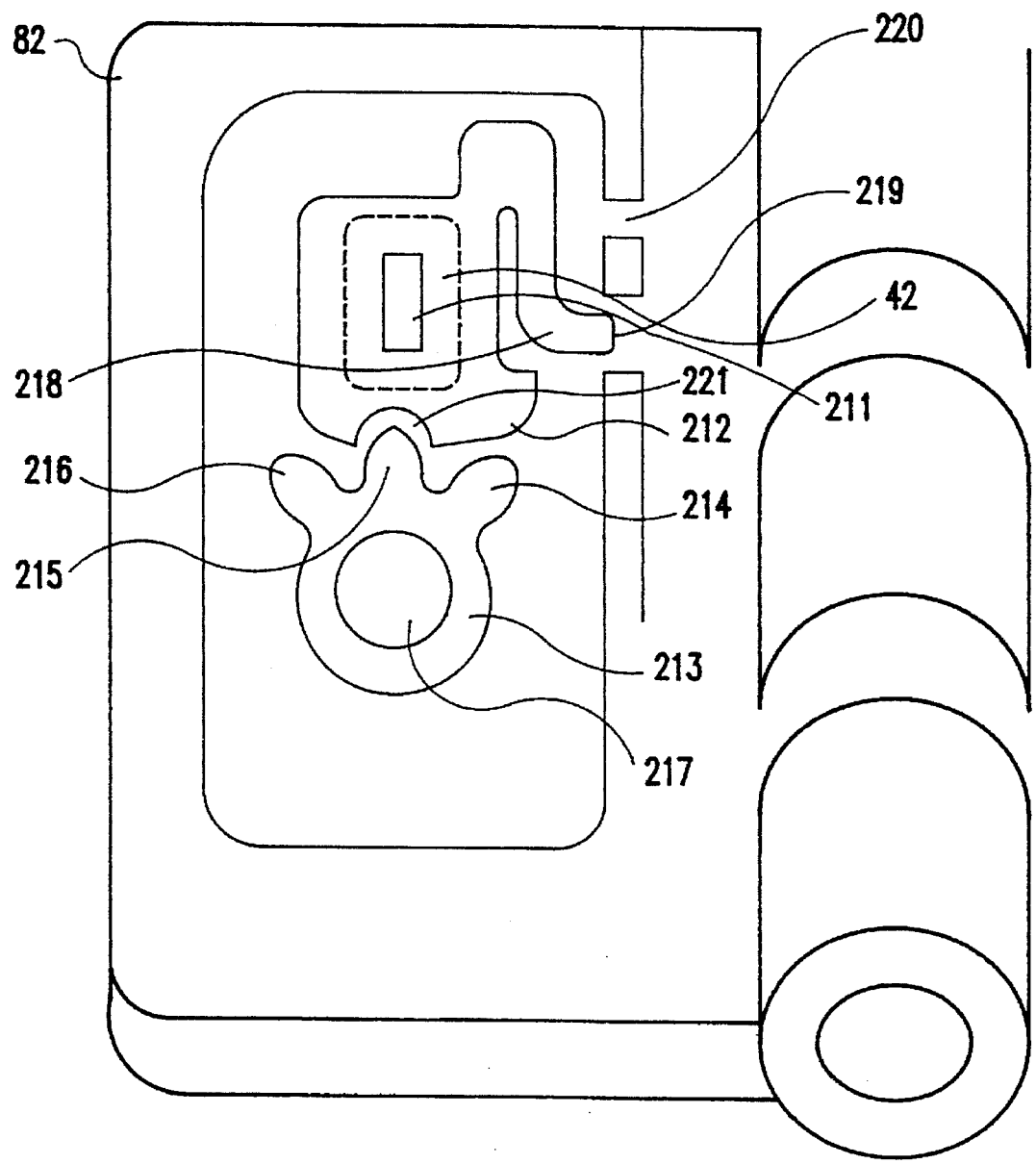
FIGS. 11 and 12a–12c show alternative configurations for locking the wheels of a wheeled platform to roll along specified lines of direction.

FIG. 11 shows an example of a wheel locking arrangement positioned on the rotatable hinge plate 82. The locking arrangement shown in FIG. 11 is the same as that shown on FIG. 2 wherein a slidable locking button 42 is used to selectively lock the wheels 38 to roll along a fixed path. With specific reference to FIG. 11, the wheel is connected to shaft 217 on which is mounted cam 213, thus, rotation of the wheel causes the shaft 217 to turn the cam 213. The cam 213 is preferably provided with a plurality of lobes 214, 215, and 216, which interact with slot 221 in the slidable lock 212. The lobes 214–216 will be chosen to orient the wheels to roll along desired pathways (e.g., "sweep lock" and "track lock" modes). The wheel orientation is set by sliding locking button 42 forward. Button 42 is affixed to the slidable lock 212 by button mount 211 which extends through the rotatable hinge plate 82 and is freely moveable within a track (not shown). Sliding the button 42 causes the locking pawl 218 to move from locking hole 219 to locking hole 220. When the slidable lock 212 has locking pawl 218 in locking hole 220, the wheel affixed to shaft 213 is freely rotatable. Locking hole 220 is not necessarily required for providing the ability to selectively lock the wheels; however, in some instances an operator may want the wheels to be freely moveable, and locking hole 220 allows the operator to use the wheels in a freely movable mode. In order to lock the wheel attached to shaft 217, the operator rotates the wheel to a desired orientation wherein one of the lobes 214–216 is positioned to interact with slot 221. The operator then slides the locking button 42 towards the rear such that the lobe 214–216 is captured in the slot 221 in the slidable lock 212, and the locking pawl 218 engages the locking hole 219.

Figures 12A, 12B, 12C:
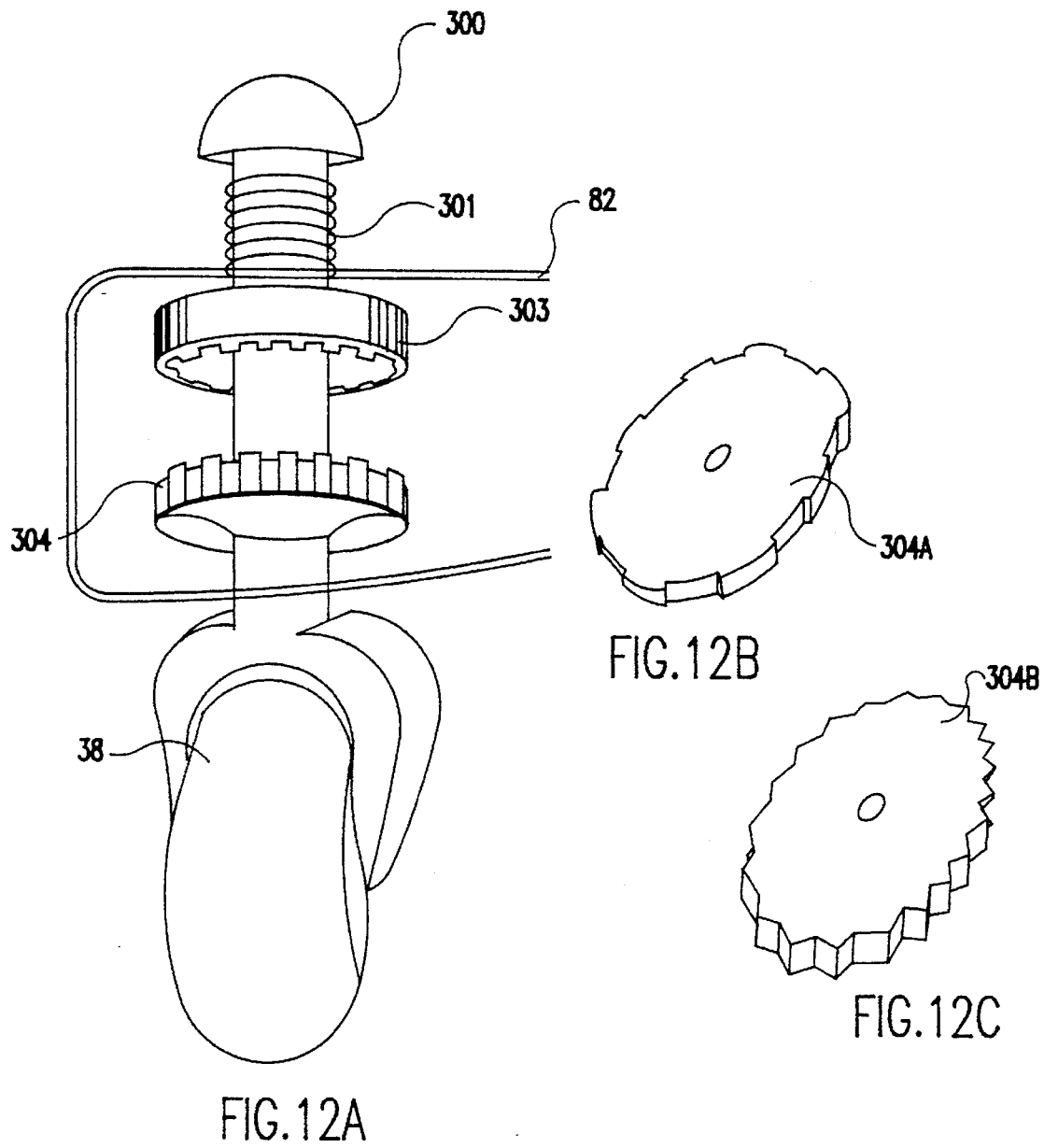

FIG. 12a shows another example of a wheel locking arrangement positioned on rotatable hinge plate 82. A shaft 300 attached to wheel 38 passes through the hinge plate 82. A locking member 303 attached to the shaft 300 is biased downwards towards cam 304 by spring member 301 and interacts with the cam surfaces to lock the wheel in a desired orientation. FIGS. 12b–c show different cam designs 304a and 304b which could be used in the practice of the invention to allow fewer and larger numbers of fixed positions for the wheels, respectively.

Figure 13:
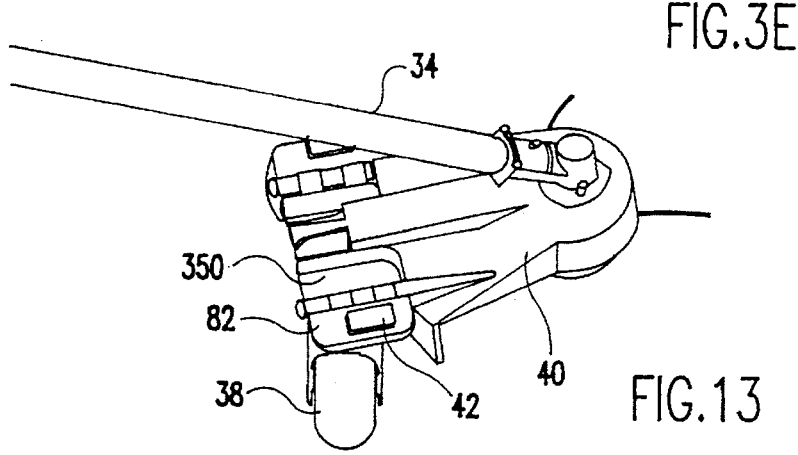
FIG. 13 is an isometric view of a wheeled platform of the present invention showing the wheel assembly in the "in use" configuration, and a wheel assembly depression for receiving the plate on which the wheel is mounted when the wheel is moved to a "storage" configuration.

FIG. 13 shows a detailed view of a wheeled platform 40 wherein the wheels 38 are affixed to the rotatable hinge plate 82. As discussed above, the locking button 42 is slidable forward and rearward to achieve locking of the wheels 38 to roll along fixed path. The wheeled platform includes a depression 350 sized to accommodate the rotatable hinge plate 82 and locking button 42, such that when the hinge plate is rotated to move the wheels 38 to the "storage" configuration, the wheels neatly fit behind the shaft 34 of the line trimmer and project upwards.

While FIGS. 11–13 show locking arrangements positioned on a rotatable hinge plate 82, it is expected that these and other arrangements could be used on a wheeled platform that does not include deployable wheels. That is, the wheels could be mounted directly on the platform itself.

While the invention has been described in terms of its preferred embodiments, those skilled in the art will recognize that the invention can be practiced with modification within the spirit and scope of the appended claims.

We claim:

1. A power trimmer, comprising:

a cutting assembly;

a handle assembly; and a shaft connecting said cutting assembly to said handle assembly, said handle assembly comprising a fore arm contacting element having a trough and a handle positioned in alignment with said trough of said fore arm contacting element for allowing a user's fore arm to be braced against said fore arm contacting element when said handle is gripped by a user's first hand, said trough extending from a point remote from said handle substantially up to said handle, said handle having a top and a bottom, said top of said handle being above a plane passing through a bottom of said trough of said fore arm contacting element.

2. The power trimmer of claim 1 wherein said shaft is aligned with said trough in said fore arm contacting element and said handle.

3. The power trimmer of claim 1 further comprising a motor for providing power to said cutting head.

4. The power trimmer of claim 1 wherein said handle is oriented at an angle of 20°–90° with respect to a plane which passes through said trough of said fore arm contacting element.

5. The power trimmer of claim 1 wherein said handle is oriented at an angle of 35°–55° with respect to a plane which passes through said trough of said fore arm contacting element.

6. The power trimmer of claim 1 further comprising:

means for rotating said handle along an arc which is in alignment with said shaft and said fore arm contacting element, said handle being positionable at a plurality of angular orientations relative to said shaft along said arc; and means for locking said handle at a selected angular orientation on said arc.

7. A cutting tool comprising:

a cutting head;

a shaft having first and second ends, said first end being connected to said cutting head;

a handle assembly connected to said second end of said shaft;

a protective shroud connected to said shaft covering at least a portion of said cutting head;

at least one wheel connected to said protective shroud;

a means for pivoting said wheel between a ground engaging and a non-ground contacting position, said means for pivoting being positioned to pivot said wheel towards and away from said cutting head as said wheel pivots respectively between said ground engaging and said non-ground contacting positions; and means for locking said wheel in either said ground engaging or said non-ground contacting position.

8. The cutting tool of claim 7 wherein said means for pivoting includes a pivot plate, said wheel being connected to said pivot plate.

9. The cutting tool of claim 8 further comprising wheel locking means positioned on said pivot plate for locking said wheel to roll along a desired path.

10. The cutting tool of claim 7 wherein said cutting assembly includes first and second wheels connected to said shroud on opposite sides of said shaft, and sweep-lock means for locking said first wheel and said second wheel to roll along first and second lines which are offset from perpendicular to said shaft by equal and opposite angular degrees.

11. The cutting tool of claim 10 wherein said first and second wheels are positioned behind said cutting head of said cutting assembly.

12. The cutting tool of claim 7 wherein said cutting head includes a filament.

13. A cutting tool comprising:

a cutting head;

a shaft having first and second ends, said first end being connected to said cutting head;

a handle assembly connected to said second end of said shaft having a fore arm contacting element and a handle;

means for rotating said handle along an arc which is in alignment with said shaft and said fore arm contacting element, said handle being positionable at a plurality of angular orientations relative to said shaft along said arc; and means for locking said handle at a selected angular orientation on said arc.

14. The cutting tool of claim 13 further comprising a shaft mounted handle mounted on said shaft.

15. The cutting tool of claim 14 further comprising a means for pivoting said shaft mounted handle relative to said shaft.

16. The cutting tool of claim 13 further comprising an actuator positioned on said handle for selectively engaging and disengaging said means for locking.

17. The cutting tool of claim 13 wherein said fore arm contacting element includes a trough for accommodating a user's forearm.

18. The cutting tool of claim 13 wherein said fore arm contacting element is angularly adjustable relative to said shaft.

19. The cutting tool of claim 13 wherein said cutting head includes a filament.

* * * * *